United States Patent [19]

Rekers

[11] Patent Number: 4,460,445
[45] Date of Patent: Jul. 17, 1984

[54] RADIATION-STABLE POLYOLEFIN COMPOSITIONS CONTAINING BENZALDEHYDE ACETALS

[75] Inventor: John W. Rekers, Spartanburg, S.C.

[73] Assignee: Milliken Research Corporation, Spartanburg, S.C.

[21] Appl. No.: 470,774

[22] Filed: Feb. 28, 1983

[51] Int. Cl.³ .......................... C08K 5/15; C08K 5/06
[52] U.S. Cl. ................... 204/159.2; 524/108; 524/369; 252/404; 252/407
[58] Field of Search ............... 523/125, 126; 524/108, 524/369; 252/404, 407; 204/159.2

[56] References Cited

U.S. PATENT DOCUMENTS

| | | | |
|---|---|---|---|
| 2,802,804 | 8/1957 | Reid et al. | 524/369 |
| 2,922,776 | 1/1960 | Wulff et al. | 524/108 |
| 3,537,967 | 11/1970 | Kelly et al. | 204/159.2 |
| 3,843,402 | 10/1974 | Albarino et al. | 524/108 |
| 3,940,325 | 2/1976 | Hirao | 204/159.2 |
| 4,016,118 | 4/1977 | Hamada et al. | 523/100 |
| 4,101,720 | 7/1978 | Taylor et al. | 523/126 |
| 4,294,747 | 10/1981 | Su | 524/108 |
| 4,371,645 | 2/1983 | Mahaffrey | 524/108 |
| 4,388,119 | 6/1983 | Uchiyama | 524/108 |

FOREIGN PATENT DOCUMENTS

| | | | |
|---|---|---|---|
| 49-16107 | 4/1974 | Japan | 524/108 |
| 53-58547 | 5/1978 | Japan | 524/108 |
| 53-117044 | 10/1978 | Japan | 524/108 |
| 53-132049 | 11/1978 | Japan | 524/108 |
| 56-149451 | 11/1981 | Japan | 524/369 |

*Primary Examiner*—Veronica P. Hoke
*Attorney, Agent, or Firm*—H. William Petry; Terry T. Moyer

[57] ABSTRACT

An olefinic polymer composition is provided which comprises an olefinic polymer selected from homopolymers and copolymers made from aliphatic, ethylenically unsaturated monomers containing from 2 to about 10 carbon atoms; from about 100 to about 3,000 parts per million based on the weight of the total composition of a hindered phenolic stabilizer; and from about 100 to about 10,000 ppm based on the weight of the composition of a stabilizer selected from compounds of the formula:

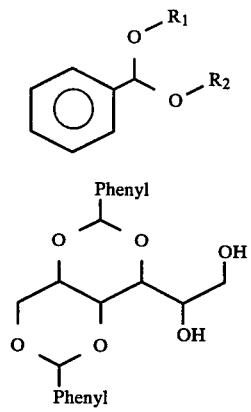

wherein $R_1$ and $R_2$ are each independently selected from an alkyl group containing from 1 to about 20 carbon atoms or alternatively $R_1$ and $R_2$ may together with the oxygen atoms to which they are joined form a heterocyclic ring containing two oxygen atoms.

7 Claims, No Drawings

RADIATION-STABLE POLYOLEFIN COMPOSITIONS CONTAINING BENZALDEHYDE ACETALS

The present invention relates to compositions of olefinic polymers suitable for high energy radiation treatment. More particularly, the present invention relates to olefinic polymer compositions which are stable to sterilizing dosages of high energy radiation such as gamma radiation.

Olefinic polymers, such as polyethylene and polypropylene, have a wide variety of known end use applications. Recently, as disclosed for instance in U.S. Pat. No. 3,940,325 to Hirao (Chisso), olefinic polymers have been disclosed to be useful in the manufacture of shaped articles for medical uses and for food packaging uses where the articles must undergo sterilization or be disinfected. It has also been reported that sterilization of such shaped articles may advantageously be accomplished by irradiating the article with high energy radiation such as gamma radiation.

Notwithstanding the significant known advantages of sterilization by means of high energy radiation, several disadvantages are known to be associated with such sterilization techniques. First, when treated with radiation energy in an amount sufficient to achieve the desired sterilization, such polyolefin compositions may become discolored. As reported in U.S. Pat. No. 3,537,967 to Kelly et al. (Dart Industries), this coloration may occur for a variety of reasons such as the use of certain additives in the polymer, as well as the presence of high amounts of catalytic residues such as titanium and chlorine. Simple removal of the additives from the olefinic polymer composition has not been found to be a satisfactory solution to the problem because, as reported by Hirao, while polmers which do not contain the standard additives may not be subject to such coloration, the physical properties of the shaped articles made from such polymers after irradiation with, for instance, γ-rays may be disadvantageously degraded.

Some of the most common additives found in polyolefin polymer compositions to be made into shaped articles, especially where increased melt temperatures or higher melt index polymers are required, are the so-called primary antioxidants employed to retard radical chain oxidation. The most common primary antioxidants are phenolic in nature. Examples include Goodrite 3114 and 3125 which are phenolic antioxidants available from B. F. Goodrich Chemical Company. When used at effective concentrations to provide both processing and radiation stability these compounds have been found to cause the shaped article, which has been irradiated with a sterilizing dose, to be unacceptably discolored.

Accordingly, it would be highly desirable to provide olefinic polymer compositions which may be made into shaped articles that may be irradiated with sterilizing amounts of radiation while minimizing or eliminating undesirable discoloration or degradation in physical properties. The olefinic polymer compositions and shaped articles made therefrom according to the present invention may be employed to accomplish such desirable result.

According to the present invention an olefinic polymer composition is provided which comprises an olefinic polymer selected from homopolymers and copolymers made from aliphatic, ethylenically unsaturated monomers containing from 2 to about 10 carbon atoms; from about 100 to about 3,000 parts per million based on the weight of the total composition of a hindered phenolic stabilizer; and from about 100 to about 10,000 ppm based on the weight of the composition of a stabilizer selected from compounds of the formula:

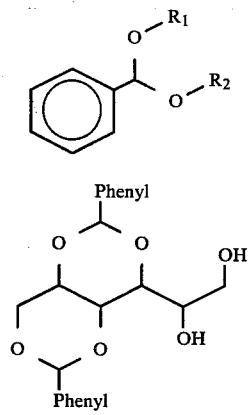

wherein $R_1$ and $R_2$ are each independently selected from an alkyl group containing from 1 to about 20 carbon atoms or alternatively $R_1$ and $R_2$ may together with the oxygen atoms to which they are joined form a heterocyclic ring containing two oxygen atoms.

The alkyl groups referred to above may be straight chain, branched chain or even cyclic alkyl groups. Examples of alkyl groups which may be employed include methyl, ethyl, isopropyl, tert butyl, nonyl, dodecyl and eicosyl groups.

Where, for instance, in the embodiment where $R_1$ and $R_2$ are joined together, compounds which are contemplated include the following:

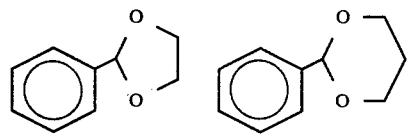

or even substituted compounds such as, for instance:

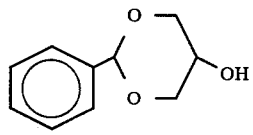

The present invention also relates to an additive package for an olefinic polymer composition, which comprises 100 parts of a hindered phenolic stabilizer; and from about 20 to about 2000 parts of a stabilizer selected from benzaldehyde acetal compounds of the formula:

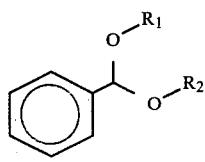

wherein $R_1$ and $R_2$ are each independently selected from an alkyl group containing from 1 to about 20 carbon atoms or alternatively $R_1$ and $R_2$ may together with the oxygen atoms to which they are joined form a heterocyclic ring containing two oxygen atoms.

The stabilizers which may be employed according to the present invention may be very broadly described as having the structural formula set forth above. In general such stabilizers may be employed in an amount of from about 100 to about 10,000 parts per million (ppm) based on the weight of the total composition. Preferably, the amount employed may be from about 500 to about 5,000 ppm. Examples of preferred stabilizers that may be employed include benzaldehyde acetals such as those set forth in Table I below:

TABLE I

| Benzaldehyde Acetals | Name |
|---|---|
| 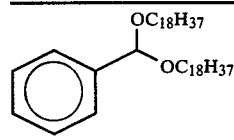 | Benzaldehyde dioctadecyl acetal |
| 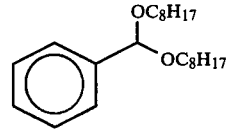 | Benzaldehyde dioctyl acetal |
| 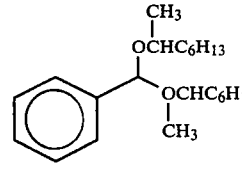 | Benzaldehyde di-2-octyl acetal |
| 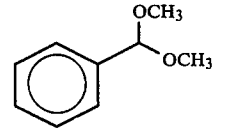 | Benzaldehyde dimethyl acetal |
| 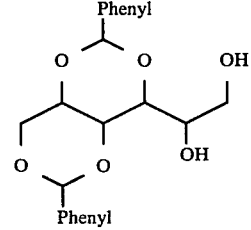 | Dibenzylidene sorbitol |

It has been found that the olefinic compositions may contain one or more known, phenolic based, primary stabilizers, such as hindered phenolic-type compounds in addition to the benzaldehyde acetal compound. This discovery is particularly significant since it may not be possible in the practical world to process polypropylene without a phenolic primary antioxidant, the presence of which may lead to yellowing on irradiation. The present invention may provide a remedy for this phenomenon. In such instance, even stabilizers which have been observed to cause discoloration in the polymer composition when subjected to radiation sterilization may not cause such discoloration when the benzaldehyde acetal compound is also present in the composition. Such primary stabilizers may be provided in the composition in an amount of from about 100 to about 3,000 ppm, preferably from about 500 to about 2,000 ppm.

The olefinic polymer compositions of the present invention may also include one or more so-called secondary antioxidants or synergists. These secondary antioxidants are known for use in association with phenolic-type primary stabilizers and include a wide variety of compounds which in general may function by converting harmful peroxide compounds present in the polymeric composition to non-harmful, non-radical products. Examples of such secondary antioxidants include dilauryl thiodipropionate, distearyl thiodipropionate, trisnonylphenyl phosphite, dilauryl phosphite, and Weston 618 and Weston 619, which are phosphorus-containing antioxidants available from Borg Warner. In general, such secondary stabilizers may be used in an amount of from about 100 to about 10,000, preferably about 500 to about 3,000 ppm.

Olefinic polymers that may be employed according to the present invention include a wide range of olefinic homopolymers and copolymers of ethylene, propylene, butene-1 and higher homologues containing up to about 10 carbon atoms. Typically such polymers may have a molecular weight of from about 10,000 to about 500,000, preferably about 30,000 to about 300,000. The preferred polymers applicable for use according to this invention are homopolymers of propylene and random or block copolymers of propylene with other mono-α-olefins such as ethylene, butene-1 and higher homologues containing up to 10 carbon atoms. Blends of such propylene polymers with other polymers such as polyethylene are also included within the scope of this invention. Generally the proportion of polymerized propylene in the total resin phase of the composition should be at least about 60 percent by weight.

In general, the radiation treatment can be applied to polymers of propylene useful particularly for medical purposes although this particular end use should not be understood to be a limitation upon the scope of the present invention. Thus, for instance, the olefinic polymer compositions of the present invention may be employed for other end uses where such radiation treatment is necessary or desirable, e.g., meat packaging, preserving food in retail packages and other uses.

The high energy radiation treatment of the olefinic polymer compositions of the present invention may include any of a wide variety of known treatment techniques. One convenient radiation source is a cobalt 60 source. Other radiation treatments that may be employed include high energy x-rays, or high energy electrons (β-radiation). In general, radiation dosages that can be applied may range up to about 5 megarads. For sterilization purposes, a shaped article may be generally sterilized by applying 2.5 megarads under gamma radiation.

The benzaldehyde acetal compounds of the present invention may be commercially available compounds, e.g., dibenzylidene sorbitol (available from Milliken Chemical, Inman, S.C.); dimethyl acetal, etc. Alternatively, if the compounds are not commercially available they may be conveniently prepared as set forth in the examples of this application as will be apparent to those skilled in the art.

The following examples are provided to illustrate the invention but are not to be construed as unduly limiting the subject matter thereof which is defined in the appended claims.

EXAMPLE 1

Preparation of benzaldehyde acetals

The general procedure for preparation of benzaldehyde acetals is exemplified by the following procedure for benzaldehyde dioctadecyl acetal. A mixture of 54.1 g of 1-octadecanol, 10.6 g of benzaldehyde, and 0.5 g of p-toluenesulfonic acid in 125 ml of cyclohexane was refluxed with water separation for 4 hours. After cooling the reaction was treated with 1 g of potassium hydroxide in 20 ml of methanol, washed with brine, and concentrated under reduced pressure to ca. 100 ml total volume. The solid which precipitated on cooling was collected by filtration, washed with methanol, and recrystallized from a 10:1 cyclohexane/methanol mixture to give 21.9 g of the colorless acetal, m.p. 48°–50°.

EXAMPLES 2–3

Benzaldehyde di-1-octyl acetal (b.p. 196°–197° C., 2 mm) and benzaldehyde di-2-octyl acetal (b.p. 180° C., 1.5 mm) were prepared in a similar manner to the procedure set forth in Example 1.

EXAMPLE 4

The additives were blended into polypropylene powder (Hercules Profax 6301), extruded into pellets, and injection molded into 55 mil thick plaques. The molded samples were irradiated to a 5 mrad dose with a cobalt-60 γ-ray source, and subsequently aged for four weeks at 50° C. in a forced air oven. Yellowness indices were measured on a Hunter Colorimeter (ASTM D 1925) before and after ageing. This data for various additive formulations is shown in Table II.

TABLE II

| Entry | Additives | (% by wt.) | Yellowness Index Unaged | Yellowness Index Aged |
|---|---|---|---|---|
| 1 | Goodrite 3114 | (0.1%) | 7.6 | 9.2 |
| 2 | Benzaldehyde dioctadecyl acetal | (0.2%) | 2.0 | 2.1 |
| 3 | Benzaldehyde dioctadecyl acetal | (0.1%) | 5.6 | 6.3 |
|   | Goodrite 3114 | (0.1%) |   |   |
| 4 | Benzaldehyde dioctyl acetal | (0.2%) | 2.9 | 3.0 |
| 5 | Benzaldehyde dioctyl acetal | (0.1%) | 5.2 | 5.6 |
|   | Goodrite 3114 | (0.1%) |   |   |
| 6 | Benzaldehyde di-2-octyl acetal | (0.2%) | 2.5 | 2.6 |
| 7 | Benzaldehyde di-2-octyl acetal | (0.1%) | 4.6 | 5.1 |
|   | Goodrite 3114 | (0.1%) |   |   |
| 8 | Benzaldehyde dimethyl acetal | (0.2%) | 2.2 | 2.4 |
| 9 | Benzaldehyde dimethyl acetal | (0.1%) | 5.0 | 5.4 |
|   | Goodrite 3114 | (0.1%) |   |   |
| 10 | Dibenzylidene sorbitol | (0.2%) | 1.3 | 1.0 |
| 11 | Dibenzylidene sorbitol | (0.1%) | 4.5 | 5.4 |
|   | Goodrite 3114 | (0.1%) |   |   |
| 12 | none |   | 1.9 | 1.6 |

EXAMPLE 5

Injection molded polypropylene tensile bars were prepared, irradiated and aged as in Example 4. As a measure of relative embrittlement, percent elongation at break was recorded before and after ageing on an Instron testing machine (ASTM D 633, 100% strain rate). This data for various additive formulations is shown in Table III.

TABLE III

| Entry | Additives | (% by wt.) | % Elongation at Break Unaged | % Elongation at Break Aged |
|---|---|---|---|---|
| 1 | Goodrite 3114 | (0.1%) | 30 | 25 |
| 2 | Benzaldehyde diotadecyl acetal | (0.2%) | 120 | 5 |
| 3 | Benzaldehyde dioctadecyl acetal | (0.1%) | 260 | 30 |
|   | Goodrite 3114 | (0.1%) |   |   |
| 4 | Benzaldehyde dioctyl acetal | (0.2%) | 490 | 5 |
| 5 | Benzaldehyde dioctyl acetal | (0.1%) | 115 | 25 |
|   | Goodrite 3114 | (0.1%) |   |   |
| 6 | Benzaldehyde di-2-octyl acetal | (0.2%) | 810 | 5 |
| 7 | Benzaldehyde di-2-octyl acetal | (0.1%) | 190 | 25 |
|   | Goodrite 3114 | (0.1%) |   |   |
| 8 | Benzaldehyde dimethyl acetal | (0.2%) | 65 | 5 |
| 9 | Benzaldehyde dimethyl acetal | (0.1%) | 420 | 30 |
|   | Goodrite 3114 | (0.1%) |   |   |
| 10 | Dibenzylidene sorbitol | (0.2%) | 30 | 5 |
| 11 | Dibenzylidene sorbitol | (0.1%) | 255 | 30 |
|   | Goodrite 3114 | (0.1%) |   |   |
| 12 | none |   | 70 | 5 |

What is claimed is:

1. An olefinic polymer composition resistant to discoloration or degradation in physical properties when subjected to sterilizing amounts of radiation which comprises:
   (a) an olefinic polymer selected from homopolymers and copolymers made from at least one, aliphatic, ethylenically unsaturated monomer containing from two to about ten carbon atoms:
   (b) from about 100 to about 3,000 parts per million based on the weight of the total composition of a hindered phenolic stabilizer; and
   (c) from about 100 to about 10,000 parts per million based on the weight of the total composition of a stabilizer selected from benzaldehyde acetal compounds of the formula:

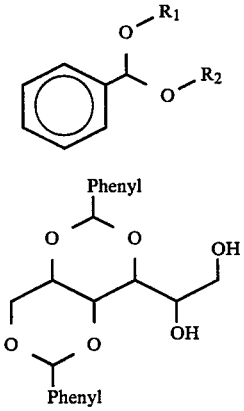

wherein $R_1$ and $R_2$ are each independently selected from an alkyl group containing from 1 to about 20 carbon atoms or alternatively $R_1$ and $R_2$ may together with the oxygen atoms to which they are joined form a heterocyclic ring containing two oxygen atoms.

2. The olefinic polymer composition of claim 1 wherein said benzaldehyde acetal compounds are selected from benzaldehyde dioctadecyl acetal, benzaldehyde dioctyl acetal, benzaldehyde di-2-octyl acetal, benzaldehyde dimethyl acetal and dibenzylidene sorbitol.

3. The olefinic polymer composition of claim 1 wherein said olefinic polymer is selected from homopolymers of polypropylene and random or block copolymers of polypropylene with other mono-α-olefins containing from one to about 10 carbon atoms.

4. An additive package for improving the resistance of an olefinic polymer composition to discoloration or degradation in physical properties when subjected to sterilizing amounts of radiation, which comprises:
   (a) 100 parts of a hindered phenolic stabilizer; and
   (b) from about 20 to about 2000 parts of a stabilizer selected from benzaldehyde acetal compounds of the formula:

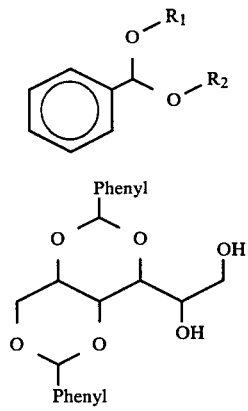

wherein $R_1$ and $R_2$ are each independently selected from an alkyl group containing from 1 to about 20 carbon atoms or alternatively $R_1$ and $R_2$ may together with the oxygen atoms to which they are joined form a heterocyclic ring containing two oxygen atoms.

5. The additive package of claim 4 wherein said benzaldehyde acetal compounds are selected from benzaldehyde dioctadecyl acetal, benzaldehyde dioctyl acetal, benzaldehyde di-2-octyl acetal, benzaldehyde dimethyl acetal and dibenzylidene sorbitol.

6. A method for sterilizing a shaped article made from an olefinic polymer composition which comprises subjecting said shaped article to high energy radiation in an amount sufficient to sterilize said shaped article; said olefinic polymer composition comprising an olefinic polymer selected from homopolymers and copolymers made from aliphatic, ethylenically unsaturated monomers containing from 2 to about 10 carbon atoms and from about 100 to about 10,000 parts per million based upon the weight of the total composition of a stabilizer selected from benzaldehyde acetal compounds of the formula:

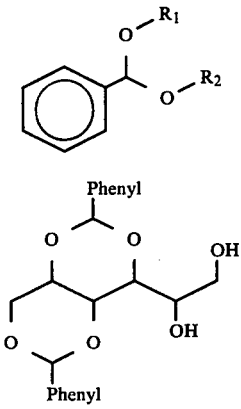

wherein $R_1$ and $R_2$ are each independently selected from an alkyl group containing from 1 to about 20 carbon atoms or alternatively $R_1$ and $R_2$ may together with the oxygen atoms to which they are joined form a heterocyclic ring containing two oxygen atoms.

7. The process according to claim 6 wherein said high energy radiation is gamma radiation.

* * * * *

UNITED STATES PATENT AND TRADEMARK OFFICE
CERTIFICATE OF CORRECTION

PATENT NO. : 4,460,445

DATED : July 17, 1984

INVENTOR(S) : John W. Rekers

It is certified that error appears in the above-identified patent and that said Letters Patent is hereby corrected as shown below:

Column 1, line 37, change "polmers" to -- polymers --.

Column 6, line 10, change "diotadecyl" in Table III to

-- dioctadecyl --.

*Signed and Sealed this*

*Twenty-third* Day of *October 1984*

[SEAL]

*Attest:*

GERALD J. MOSSINGHOFF

*Attesting Officer*     *Commissioner of Patents and Trademarks*